United States Patent [19]
King

[11] Patent Number: 6,136,184
[45] Date of Patent: Oct. 24, 2000

[54] LIQUID CHEMICAL DELIVERY SYSTEM

[76] Inventor: Lael D. King, 5100 W. 36th St., St. Louis Park, Minn. 55416

[21] Appl. No.: 09/271,800

[22] Filed: Mar. 18, 1999

Related U.S. Application Data

[60] Provisional application No. 60/078,567, Mar. 19, 1998.

[51] Int. Cl.[7] .............................. B01D 17/12; F04B 49/06
[52] U.S. Cl. ..................... 210/136; 210/143; 210/198.1; 210/532.2; 285/139.2; 417/17; 417/44.1; 417/411
[58] Field of Search .............................. 210/85, 136, 143, 210/198.1, 205, 206, 209, 532.2; 422/33; 417/17, 44.1, 411; 222/251, 333; 285/139.2, 139.3, 140.1, 141.1, 196, 206, 338

[56] References Cited

U.S. PATENT DOCUMENTS

| | | | |
|---|---|---|---|
| 3,162,134 | 12/1964 | Lovell | 417/411 |
| 3,531,142 | 9/1970 | Peasley | 285/206 |
| 3,565,480 | 2/1971 | McCollum et al. | |
| 3,731,679 | 5/1973 | Wilhelmson et al. | 417/411 |
| 3,897,089 | 7/1975 | Leichsenring et al. | 285/139.2 |
| 4,610,848 | 9/1986 | Weber | 210/198.1 |
| 4,897,797 | 1/1990 | Free et al. | 210/198.1 |
| 4,911,832 | 3/1990 | Miller et al. | 210/198.1 |
| 5,683,575 | 11/1997 | Yates et al. | 210/198.1 |

*Primary Examiner*—Joseph W. Drodge
*Attorney, Agent, or Firm*—Burd, Bartz & Gutenkauf

[57] ABSTRACT

A liquid chemical delivery system (20) has a pump (27) driven by an electric motor (28) to draw a liquid from a bottle (21) and dispenses the liquid into a septic system (12). Separate independent controls (36,37) connect the electric motor (28) with a source of electric power (34). One of the controls (253) has a wireless remote switch (273) operable to trigger an electronic control unit (268) to activate the electric motor (228) that drives the pump (227) to deliver liquid to the septic system (212).

54 Claims, 11 Drawing Sheets

LIQUID CHEMICAL DELIVERY SYSTEM

This application is a continuation of U.S. Provisional Application Ser. No. 60/078,567, filed on Mar. 19, 1998.

FIELD OF THE INVENTION

The invention relates to apparatus for discharging a controlled amount of liquid to a selected location in response to actuation of a wireless remote controller and/or wired controls. The apparatus is a liquid chemical delivery system for dispensing a liquid chemical into a septic holding tank, commonly known as a black or gray water holding tank.

BACKGROUND OF THE INVENTION

Mobile vehicles, such as motor homes, travel trailers, vans and boats, are equipped with plumbing normally associated with water utilization devices. These devices include a shower stall, wash or sink basin and a privy or toilet bowl connected to a liquid and solid holding tank. R. F. McCollum and G. W. Ward disclose in U.S. Pat. No. 3,565,480 a travel trailer having a privy connected to a holding tank located below the floor supporting the privy. Disinfecting liquid chemicals are periodically placed in the privy bowl and flushed with water into the holding tank to control odors and gases, and to break down and degrade solids in the holding tank. The liquid chemicals are usually placed in the privy bowl after the holding tank has been drained into a storage dump. The liquid chemicals are stored in bottles and cans that must be opened and manually poured into the privy bowl or directly into the holding tank. The liquid chemicals usually include formaldehyde which has a strong, pungent, irritating odor and, when spilled, will stain the floor or carpet around the bowl. The bottles of liquid chemical are usually stored in the vehicle along with other cleaning products so that it is available for use when the holding tank is dumped. The liquid chemical delivery apparatus of the invention eliminates the need for storage of the liquid chemicals in separate, portable bottles or cans and using those bottles to manually pour liquid chemicals into the privy bowl or holding tank. The strong, pungent odor, and possible spillage of the liquid chemical is also eliminated.

SUMMARY OF THE INVENTION

The invention is a method and apparatus for dispensing a liquid into a selected location. The apparatus can be operated from remote locations with manually operated, separate controls. The liquid stored in a container is pumped to the selected location with a pump driven with an electric motor. The electric motor is wired to a source of electric power. The separate controls function to turn the electric power that operates electric motor on and off to control the operation of the pump and amount of liquid discharged into the selected location. In one embodiment of the invention, separate switches wired in parallel with the source of electric power and the electric motor are used to selectively control the operation of the electric motor and pump. When one of the switches is in a remote location, the operator can control the electric motor and pump to dispense liquid to a selected location from a location remote from the electric motor, container storing the liquid, and the selected location. Another embodiment of the invention uses a wireless remote signal transmitter for actuating an electronic controller that connects the electric motor that drives the pump to a source of electric power, such as a battery. The pump draws liquid from a reservoir and discharges the liquid into a tube that transports the liquid to a selected location, such as a tank chamber. A one-way or check valve attached to the remote end of the tube prevents liquids and gases in the tank chamber from flowing back into the tube, pump and bottle. A connector attaches at the check valve to the tank or other parts of the remote location structure, including parts of the septic system. The tube can be attached to the connector whereby liquid is directed by the tube directly into the connector and dispensed into the selected location.

The preferred embodiment of the liquid delivery system delivers a measured amount of liquid chemical into a septic holding tank used with toilet systems, such as toilet systems in portable vehicles, motor homes, travel trailers, campers and marine vehicles. The liquid chemical is stored in a bottle connected to a pump driving with an electric motor. Electric controls couple the electric motor to a battery and regulate the duration of operation of the electric motor which drives the pump to draw liquid chemical from the bottle and discharge the liquid chemical into a tube extended to a septic holding tank, toilet, holding tank waste pipe or vent stack.

The electric controls include separate manually situated switches connected in parallel with the battery and electric motor. One of the switches is located in a remote location that is convenient to the vehicle operator. The operator can activate either switch to electronically connect the electric motor and battery, thereby driving the pump which pumps the liquid chemical into the toilet system. An alternate electric control for the electric motor has a wireless signal transmitter or remote control, operable to trigger a signal receiver connected to a motor controller which is alternatively used to connect the electric motor to the battery thereby driving the pump which draws liquid chemical from the bottle and discharges the liquid chemical into the tube and dispenses the liquid chemical into the septic holding tank or other parts of the septic system. A one-way or check valve attached to the remove end of the tube prevents back flow of liquids and gases from the tank into the tube, pump and bottle. The check valve is a conventional one-way valve having a housing accommodating a movable valve member and a biasing spring to retain the valve member in a closed position to block reverse flow of gas and liquid through the valve. The check valve is attached to the tank or other structure of the septic system with a connector having a passage for carrying liquid chemical to the chamber of the tank. The tube can be attached to the connector so that the liquid chemical in the tube flows directly through the connector into the tank.

The connector is an expansion fitting located in a properly dimensioned hole in the tank. An expandable cylindrical sleeve is expanded into sealing engagement with the tank wall surrounding the hole with a threaded member on an elongated bolt having an axial passage for carrying liquid chemical. The connector is installed on the tank without the need to work inside the tank to attach the connector to the wall of the tank or a pipe connected to the tank. No tools are necessary to install the connector on the tank and the check valve on the connector. The connector has utility in other fluid, vapor and gas transfer and dispensing applications.

DESCRIPTION OF PREFERRED EMBODIMENTS OF THE INVENTION

Figure 1:
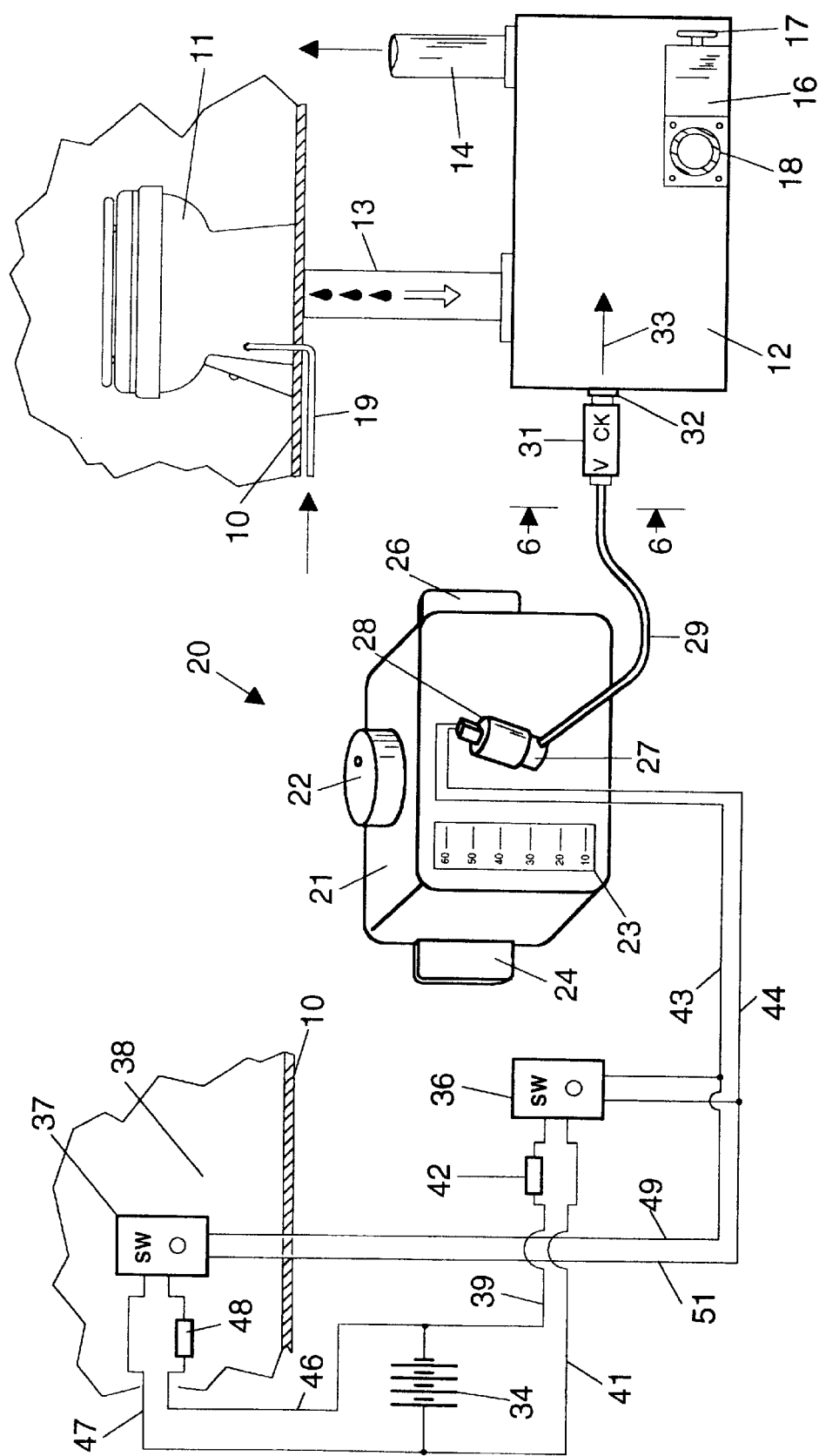
FIG. 1 is a diagrammatic view, partly sectioned, of a liquid chemical delivery apparatus of the invention associated with a septic holding tank coupled to a toilet bowl.

The liquid chemical delivery apparatus, indicated generally at 20 in FIG. 1 of the invention, operates to dispense liquids in controlled amounts to a selected location, such as a container or tank. Apparatus 20 is used in association with vehicle, such as a motor home, travel trailer, camper or boat, having a floor 10 supporting a toilet bowl 11. A septic holding tank 12 located below floor 10 connected to bowl 11 with an upright pipe 13 holds solids and liquids flushed from bowl 11. Disinfecting liquid chemicals are periodically placed in tank 12 to control odors and gases, and to break down and degrade solids in tank 12. An upright vent stack 14 joined to the top of tank 12 relieves gas pressure in tank 12 and conveys gases from tank 12 to the environment. A lower portion of tank 12 is connected to a drain valve 16 having a slidable gate 17 that is selectively moved to open and close the valve. An elongated flexible hose connected to valve 16 is used to carry liquid and solids from tank 12 to a storage dump prior to the present invention. Liquid chemicals were placed in the empty tank by manually pouring the liquid chemical from a bottle or can into tank 12 or bowl 11. These liquid chemicals have a strong, disagreeable odor and, when spilled, will stain the floor or carpet adjacent to bowl 11. The liquid chemical delivery apparatus 20 avoids the manual pouring of liquid chemicals into tank 12 or bowl 11.

Liquid chemical delivery apparatus 20 is used to dispense a controlled amount of liquid chemical into tank 12. The liquid chemical can be discharged to any of the connections to the gray or black water holding tanks. Apparatus 20 has a generally rectangular bottle or container 21 having a top cap 22 closing an inlet opening used to fill bottle 21 with the liquid chemical. Bottle 21 is a plastic container made of plastic that is compatible with the liquid chemicals. The liquid chemical can be stored in a bag or pouch. A scale 23 on the front of bottle 21 has numbers 10, 20, 30, 40, 50 and 60 providing information as to the sources of liquid chemical in bottle 21. The amount of liquid chemical dispensed into tank 12 can be observed by reading the change in the level of liquid chemical in tank 12. Additional scales can be applied to an end of bottle 21 to facilitate reading of the amount of liquid chemical in bottle 21. Opposite sides of the back of bottle 21 have outwardly directed ears 24 and 26 used to mount bottle 21 on a fixed bracket or support (not shown). Bottle 21 can be removed from the bracket so bottle can be conveniently filled with liquid chemical. A pump 27 driven with a DC electric motor 28 draws liquid chemical from bottle 21 and discharges the liquid chemical into a tube 29. Tube 29 is an elongated hose connected to pump 27 and a check valve 31 attached to tank 12 with connector 32. Valve 31 allows liquid chemical 33 to be dispensed through connector 32 into tank 12 and prevent reverse flow of liquid chemical and gases in tank 12 back into tube 29 and bottle 21. The self-sealing structure of connector 32 is hereinafter described.

Electric motor 28 is connected to a 12 volt battery 34, such as the battery of a motor vehicle. On-off switches 36 and 37 are manually operated to connect motor 28 to battery 34 to run motor 28 and drive pump 27 thereby dispensing liquid chemical into tank 12. Switch 37 is located in a remote location, such as the driver compartment 38 of a vehicle above floor 10. Switch 36 located below floor 10 is close to bottle 21 or in the same storage space as bottle 21 so that the person actuating switch 36 can visually observe scale 23 to monitor the amount of liquid chemical dispensed to tank 12. Lines 39 and 41 connected switch 36 to battery 34 and lines 43 and 44 are a cable joining switch 36 to motor 28. Line 39 contains a fuse 42. Switch 37 is connected to battery 34 with lines 46 and 47. A fuse 48 is interposed in line 46. Lines 49 and 51 join lines 43 and 44 to connect switch 37 in parallel with switch 36. Motor 28 can be operated by turning on either switch 36 or switch 37. Motor 28 will continue to run and drive pump 27 as long as one of switches 36 and 37 is on.

Figure 2:
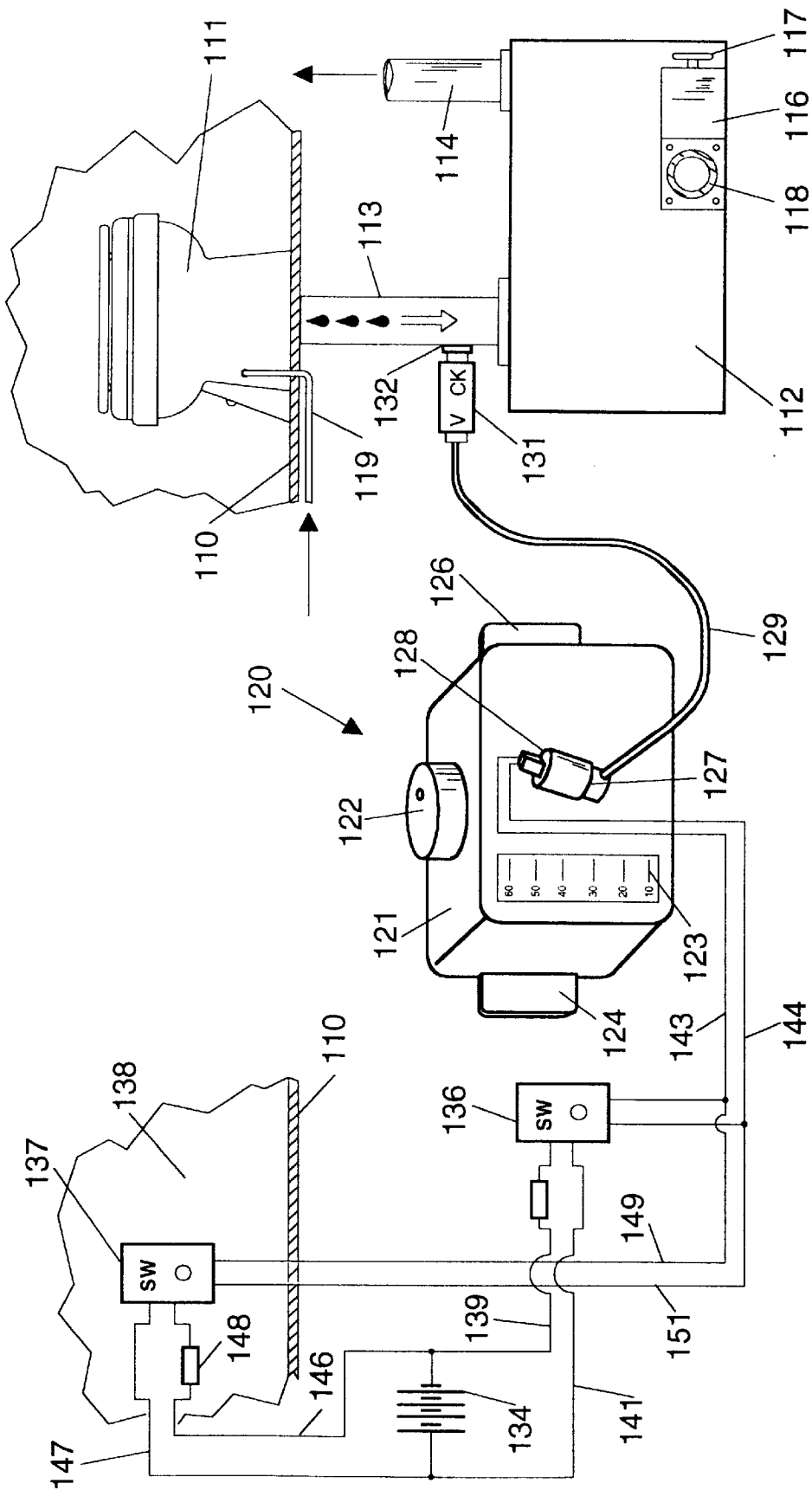
FIG. 2 is a diagrammatic view, partly sectioned, of a second embodiment of the liquid chemical delivery apparatus of FIG. 1.

Referring to FIG. 2, there is shown a first modification of the liquid chemical delivery apparatus indicated generally at 120. The parts of apparatus 120 that are the same as the parts of apparatus 20, shown in FIG. 1, have the same reference number with a prefix 1. The tube 129 from pump 127 is joined to check valve 131 which is attached to connector 132 mounted on pipe 113 that connects bowl 111 to tank 112.

Figure 3:
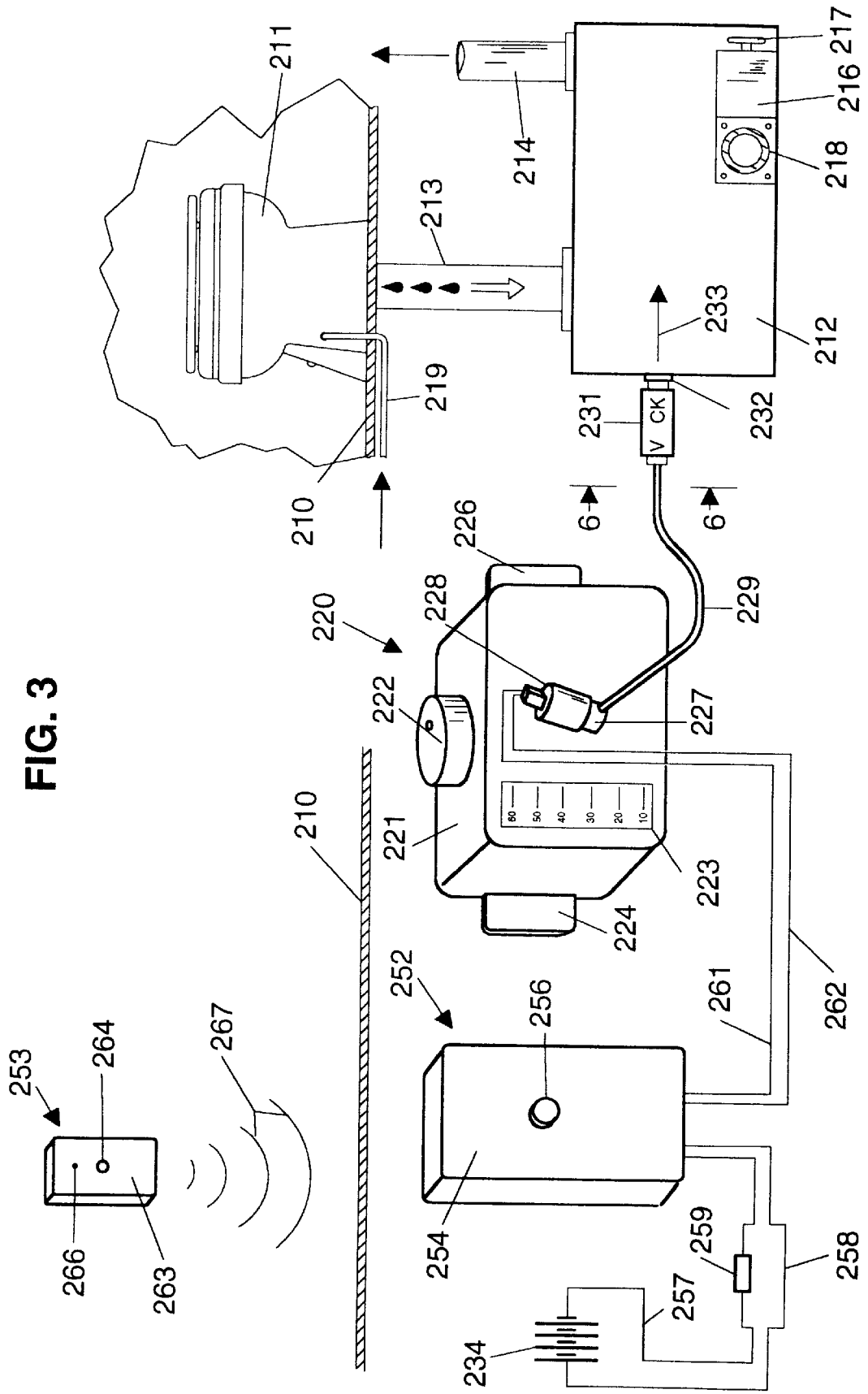
FIG. 3 is a diagrammatic view, partly sectioned, of a third embodiment, partly sectioned, of the liquid chemical delivery apparatus of FIG. 1.
Figure 5:
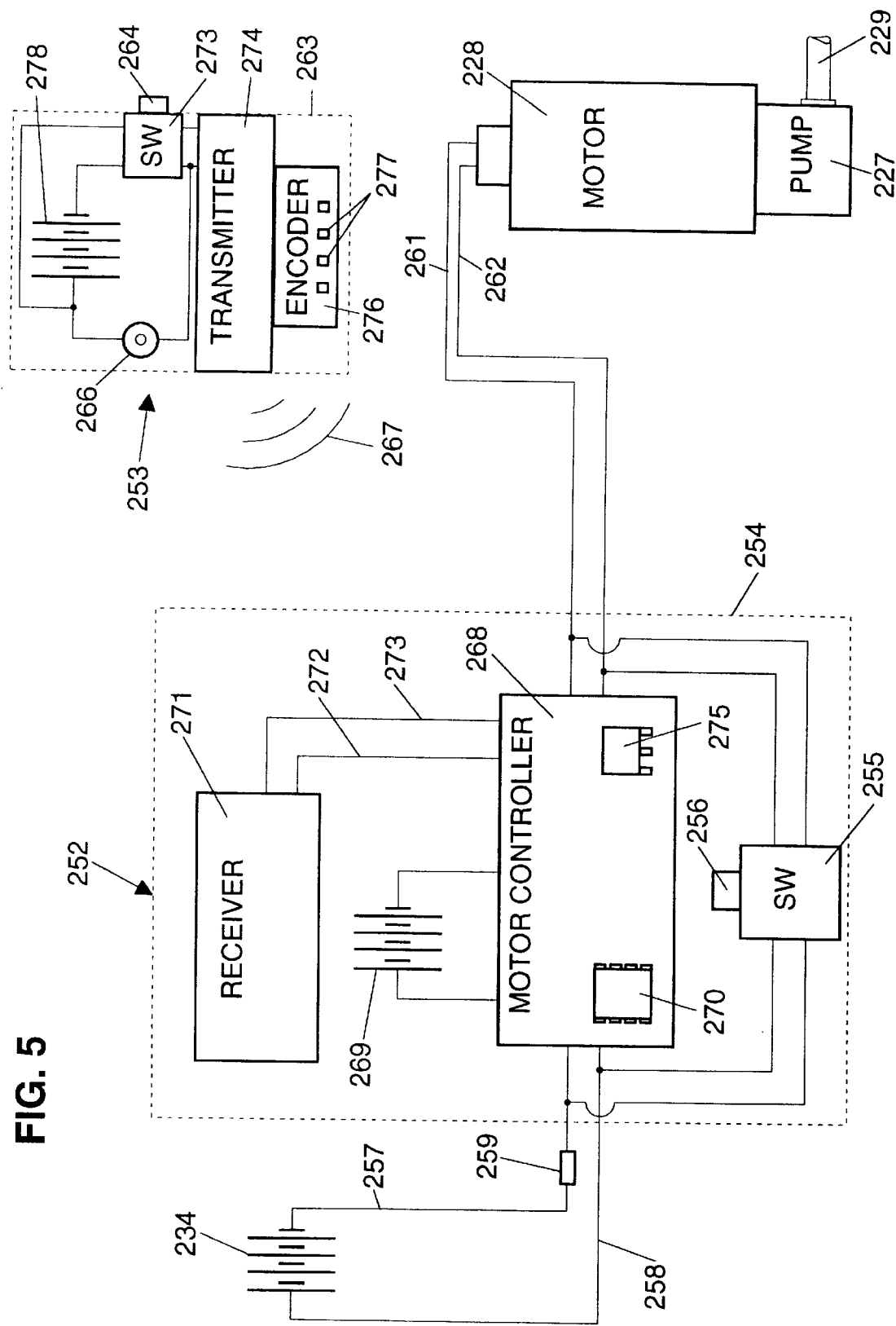
FIG. 5 is a diagram of the direct and remote control system of the liquid chemical delivery apparatus of FIGS. 3 and 4.
Figure 9:
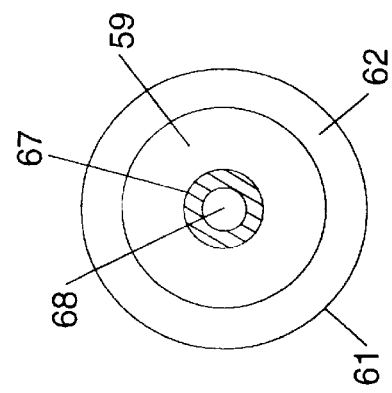
FIG. 9 is an enlarged sectional view taken along line 9—9 of FIG. 7.
Figure 6:
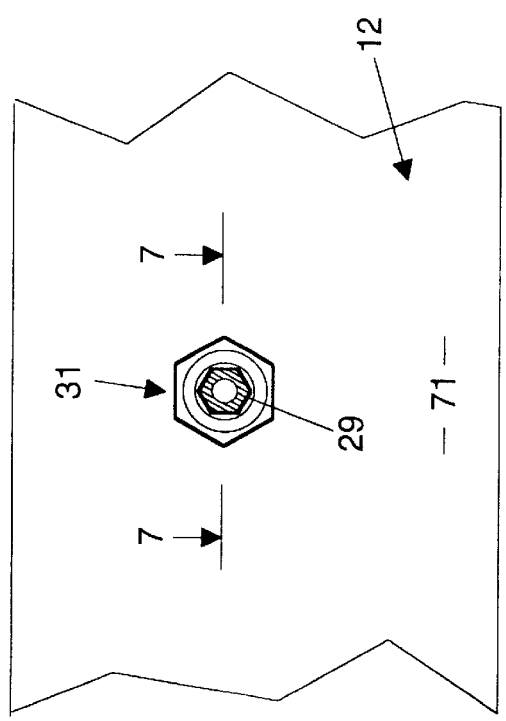
FIG. 6 is an enlarged sectional view taken along line 6—6 of FIG. 1.

Referring to FIG. 3, there is shown a second modification of the liquid chemical delivery apparatus indicated generally at 220. The components of apparatus 220 that are the same as the components of apparatus 20, shown in FIG. 1, have the same reference number with a prefix 2. The apparatus 220 has a power control unit 252 connected to motor 228 with lines 261 and 262 or electric cable. Power control unit 252 has a case or housing 254 located below floor 210 adjacent to bottle 221 to allow a person to observe scale 223 on bottle 221 and concurrently press a switch actuator 256 projected from housing 254. The person monitors scale 223 to determine the amount of liquid chemical dispensed into tank 212 when actuator 256 is operated to turn switch 255 on to connect motor 228 with battery 234. As shown in FIG. 5, switch 255 is connected to battery 234 with lines 257 and 258. Line 257 has a fuse 259. Switch 255 is connected in parallel with a motor controller 268 having a battery pack 269, such as 8AA cells, a DC motor power control micro controller 270 and a low power series voltage regulator 275. A remote signal receiver 271 is wired with lines 272 and 273 to motor controller 268. A single regulated voltage is provided by motor controller 268 to operate receiver 271. Motor controller 268 provides receiver 271 with up to 150 U Amps to permit a one year battery life, assuming normal use frequency.

A portable wireless remote control 253 having a small protective enclosure 263 is operable to activate receiver 271. Remote control 253 has a range of at least 15 meters and can be mounted anywhere above floor 210 and activated from a remote location. By activating transmitter 274 via a push button 264 a logic signal 267 will change state in receiver 271. Motor controller monitors the logic signal 267 and connects motor 228 to the power supply thereby operating pump 227 which dispenses a metered amount of liquid chemical into tank 212.

Transmitter 274 is powered with a battery 278 wired to an on-off switch 273 and light 266 which is turned on when switch 273 is on.

In use the liquid chemical delivery apparatus 220 can be operated by manually activating switch button 256 to turn switch 255 on or activating remote control 253 by pressing button 264 to energize transmitter 274. When switch 255 is on, motor 228 is connected to the electric power supply thereby operating pump 227 to dispense liquid chemical into tank 212, pipe 213, or other locations of the septic system. When remote control 253 is activated, a logic signal 267 is generated. This signal is sensed by receiver 271 which activates motor controller 268 to connect motor 228 with the power supply 234 or internal battery pack 269 to operate pump 227 and dispense liquid chemical into tank 212, pipe 213 or other locations of the septic system.

Figure 4:
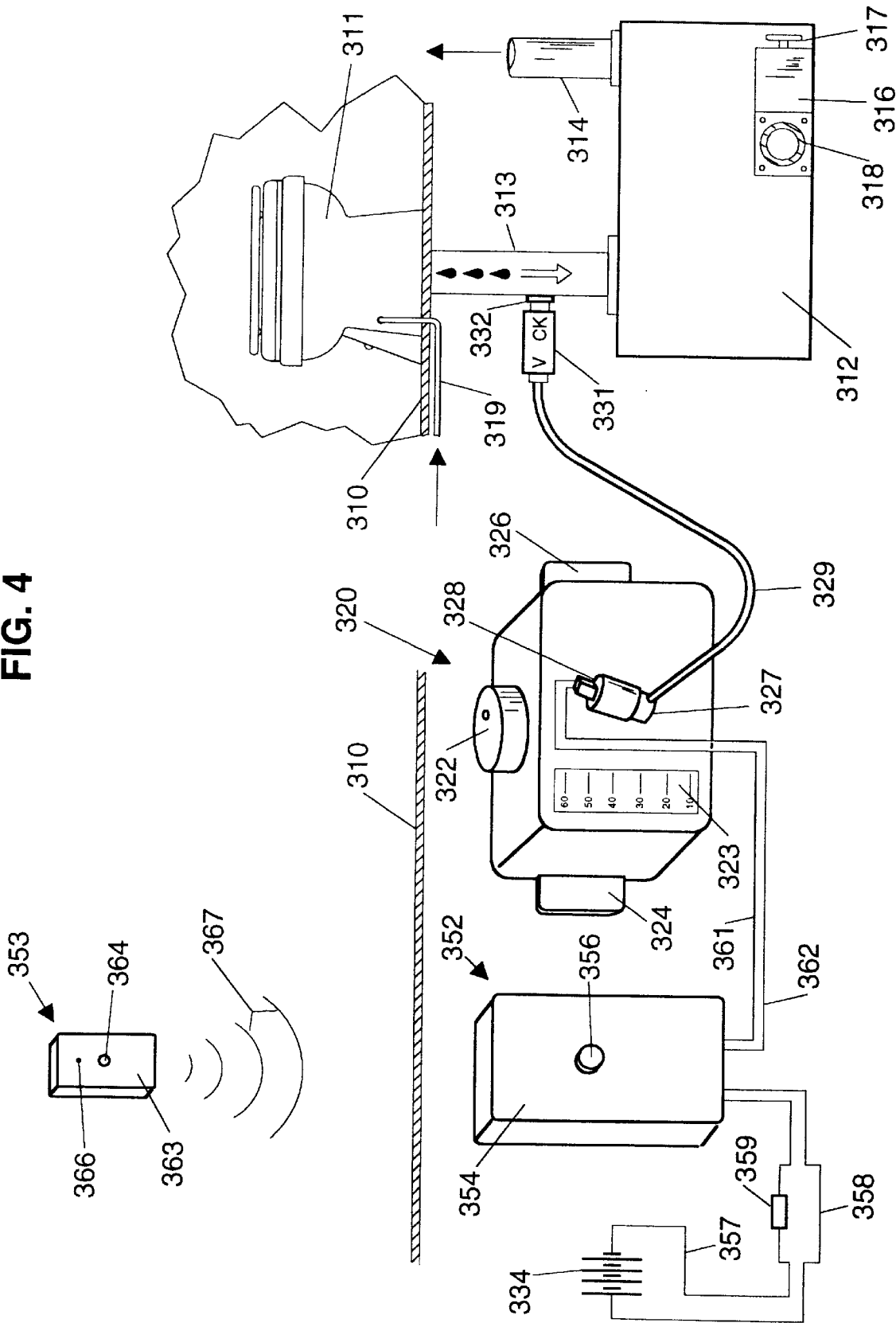
FIG. 4 is a diagrammatic view, partly sectioned, of a fourth embodiment of the liquid chemical delivery apparatus of FIG. 1.

A modification of the liquid chemical delivery apparatus having a remote control 353, indicated generally at 320, is shown in FIG. 4. The components of apparatus 320 that correspond with the components of apparatus 220 have a prefix 3 in lieu of prefix 2. Tube 329 from pump 327 is joined to check valve 331 which is attached to connector 332. Connector 332 is mounted on pipe 313 so that liquid chemical is discharged into pipe 313 and flows downward into tank 312.

Figure 7:
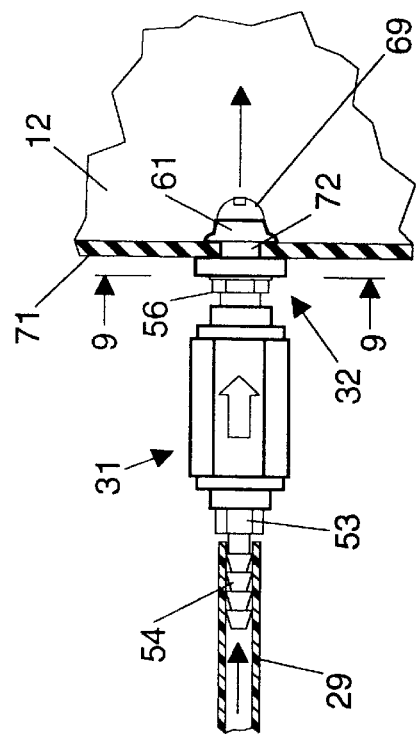
FIG. 7 is an enlarged sectional view taken along the line 7—7 of FIG. 6.
Figure 8:
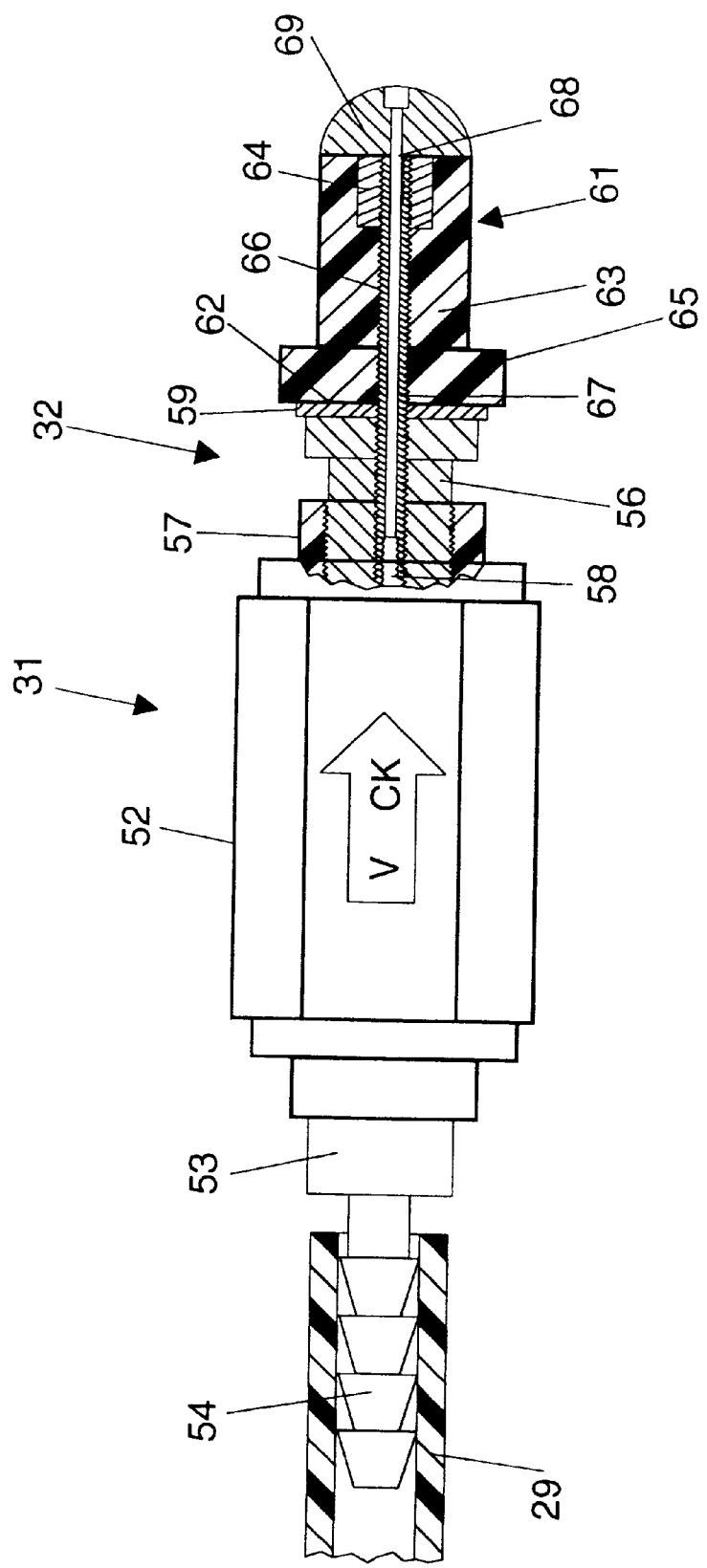
FIG. 8 is a top elevational view, partly cross sectional, of the check valve and connector shown in FIG. 7.

The check valve 31 and connector 32, shown in FIGS. 6 to 9, mounted on tank wall 71 allows liquid chemicals to be discharged into tank 12 and prevents fluids and gases from flowing back into tube 29. Check valve 31 is a conventional ball type check valve having a housing 52 with an outlet boss 57 with a passage 58. A tube adapter 53 attached to the inlet end of check valve 31 has an exterior barbed male end 54 accommodating tube 29. The liquid chemical under pressure flows through tube 29 and adapter 53 into check valve 31. Connector 32 is attached to check valve 31 with a metal adapter 56 that is threaded into outlet boss 57. A flat washer or annular member 59 is located in surface engagement with one flat annular surface of the outer end of adapter 56. The other flat annular surface of washer 59 engages a flexible sleeve 61. Sleeve 61 has a cylindrical body 63 of rubber or rubber-like material having an inner annular surface or face 62, an annular flange 65, and an axial passage 66. Washer 59 is located in surface engagement with face 62. The metal-to-metal contact between adapter 56 and washer 59 has less friction than the rubber-to-metal contact between rubber body 63 and washer 59. Washer 59 bearing against adapter 56 allows the washer 59 to turn with face 62 without cutting or abrasing body 63. The friction between washer 59 and body 63 prevents relative rotation between washer 59 and body 63. The outer end of body 63 surrounds a threaded bushing 64 having a length shorter than the length of body 63. An adhesive or epoxy can be used to bond bushing 64 to the rubber material of body 63. A cylindrical bolt or rod 67 is threaded through bushing 64 until the head 69 of bolt 67 bears against bushing 64 and the end of body 63 surrounding bushing 64 thereby locking sleeve 61 on bolt 67. Bolt 67 and head 69 have a common axial passage 68 open to passage 58 of adapter 56 to allow liquid chemical to flow through bolt 67. As shown in FIG. 8, bolt 67 extended through passage 66 in body 63 and washer 59 is threaded into adapter 56.

In use, connector 32 is mounted on tank wall 71 by inserting body 63 through a pre-drilled hole 72 in wall 71 until flange 65 is tight against the outer surface of tank wall 71. A constant inward pressure is applied to check valve 31 as it is turned to thread adapter 56 on bolt 67. The head 69 of bolt 67 moves toward flange 65 causing body 63 to swell or expand outwardly to fill hole 72 and seal against opposite sides of the wall portion surrounding hole 72. As shown in FIG. 7, body 63 annularly expands against the inside surface of wall 71 and flange 65 is retained tight against the outside surface of wall 71 thereby preventing leakage of liquid and gases through hole 72.

Connector 32 can be used in other fluid and gas transfer or dispensing applications. Connector 32 allows for the transfer of fluid, vapor or gas through any wall of a tank, tube, pipe or vessel. No tools are required if a properly dimensioned hole in the wall exists. Connector 32 has an expansion body 63 cooperating with a device that compresses the body 63 so it conforms to the size and shape of the hole in the wall and thereby mounts and seals the connector on the wall. A pipe or tube can be connected to adapter 56 to direct fluid into passage 58 and 68, in situations where a check valve is not needed.

Figure 10:
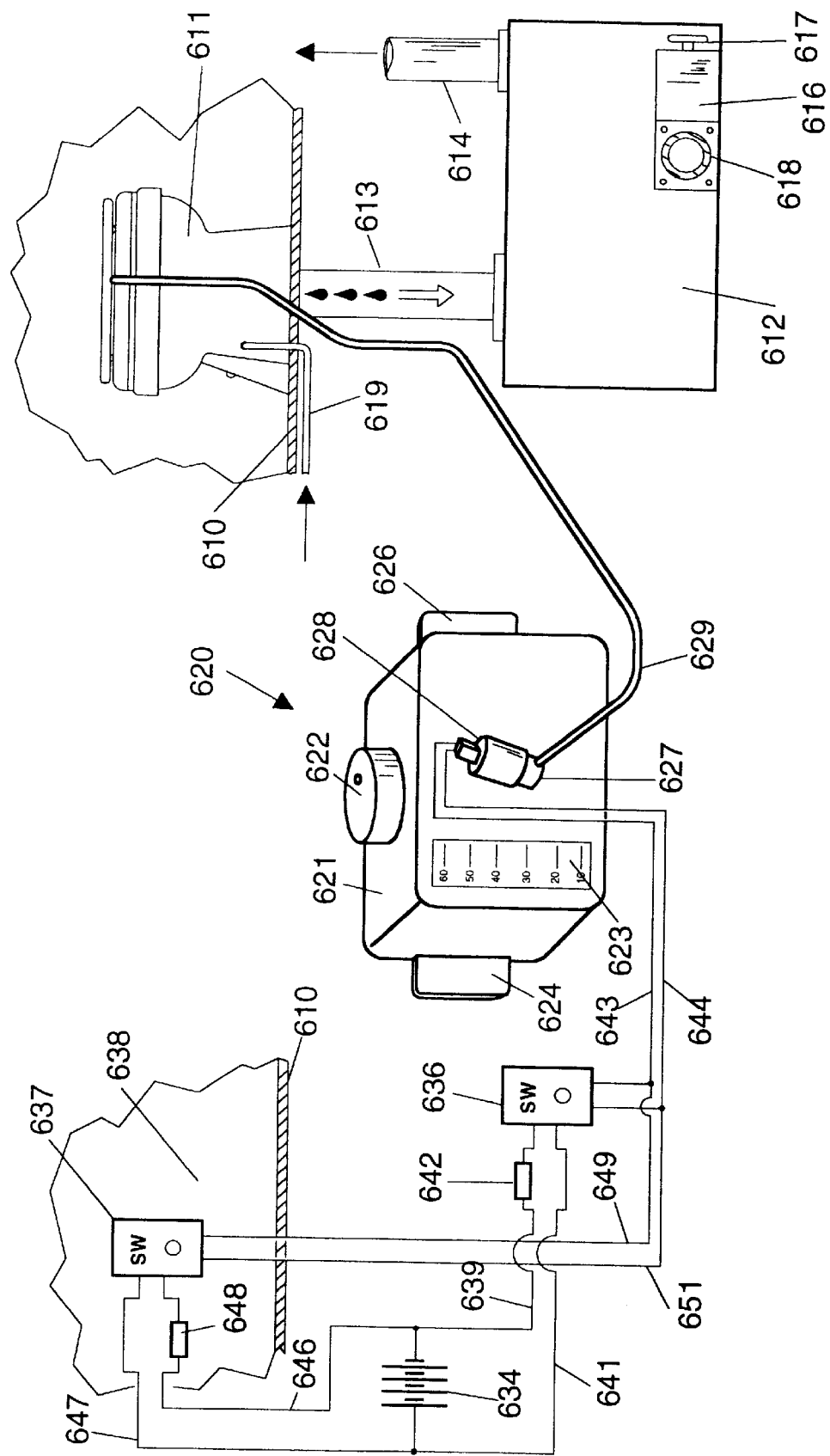
FIG. 10 is a diagrammatical view, partly sectioned, of a fifth embodiment of the liquid chemical delivery apparatus of FIG. 1.

Referring to FIG. 10, there is shown a fifth modification of the liquid chemical delivery apparatus indicated generally at 620. The parts and functions thereof of apparatus 620 that corresponds to the parts of apparatus 20, shown in FIG. 1, have the same reference number with a prefix 6. The tube 629 carrying liquid chemical discharged by pump 627 extends upwardly through floor 610 and into bowl 611. The liquid chemical is dispensed into bowl 611 and flushed along with water in the bowl into pipe 613 joined to the top of tank 612 which directs the water and liquid chemical into tank 612. A check valve is not connected to the distal end of tube 629. A check valve (not shown) can be attached to the liquid chemical discharge end of tube 629 to prevent drip and back flow of water or air from bowl 611 into tube 629. Motor 628 can be energized to operate pump 627 by activating either switch 636 or switch 637. Pump 627 draws liquid chemical from bottle 621 and discharge the liquid chemical under pressure into tube 629. The liquid chemical flows through tube 629 which directs the liquid chemical into bowl 611.

Figure 11:
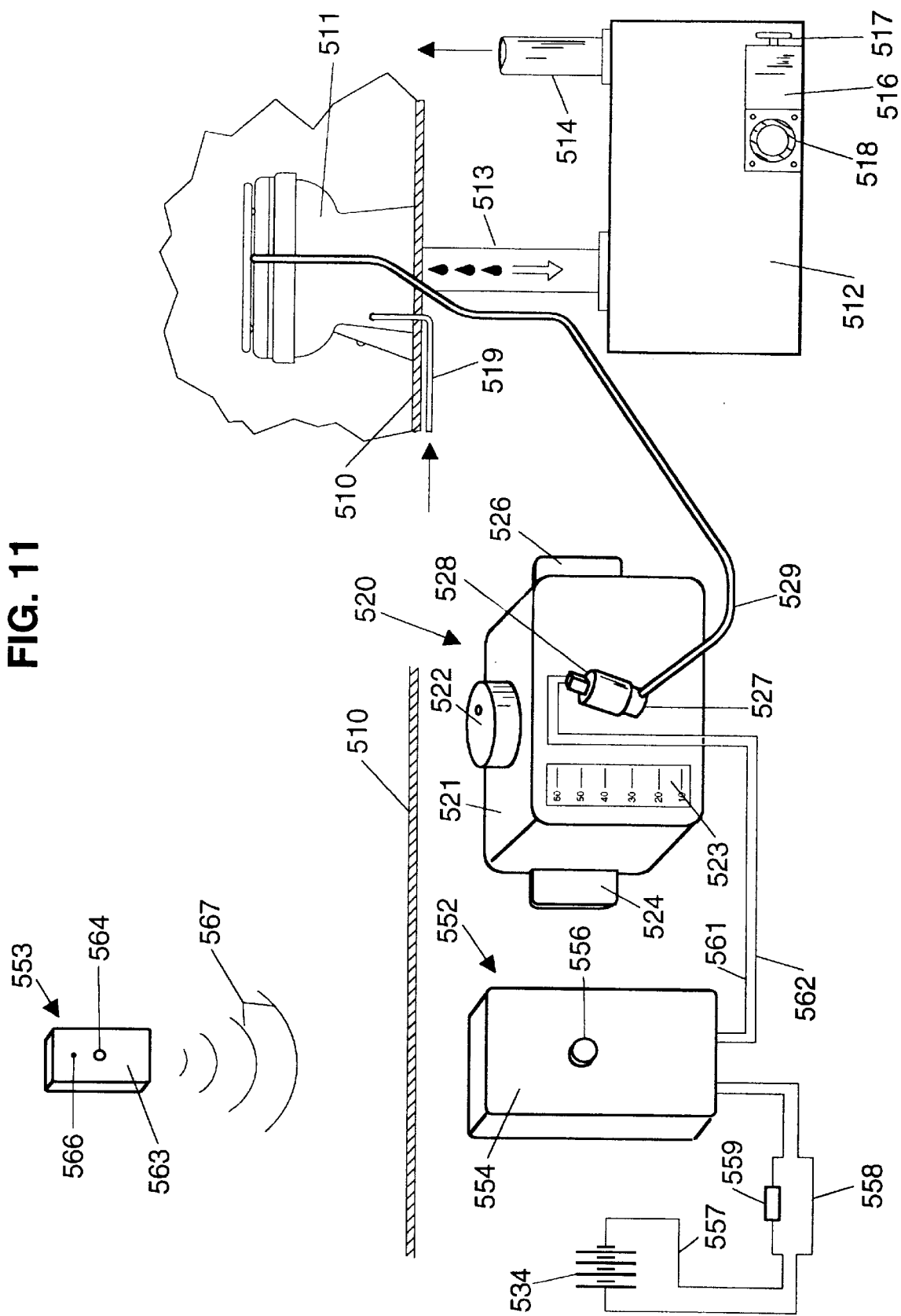
FIG. 11 is a diagrammatic view, partly sectioned, of a sixth embodiment of the liquid chemical delivery apparatus of FIG. 1.

As shown in FIG. 11, a sixth modification of the liquid chemical delivery apparatus, indicated generally at 520, operates to dispense liquid chemical directly into bowl 511. Apparatus 520 has parts that correspond to parts of apparatus 220, shown in FIG. 3, with prefix 5 in lieu of the prefix 3. Tube 529 connects pump 527 with bowl 511 to deliver liquid chemical to bowl 511. The liquid chemical and water in bowl 511 is flushed into pipe 513 which directs the liquid chemical and water into tank 512. A check valve is not connected to the distal end of tube 529. A check valve (not shown) can be attached to the liquid chemical discharge end of tube 529 to prevent drip and back flow of water or air from bowl 511 into tube 529. Motor 528 can be energized to operate pump 527 by activating either switch 552 or switch 553. Pump 527 draws liquid chemical from bottle 521 and discharges the liquid chemical under pressure into tube 529. The liquid chemical flows through tube 529 to bowl 511.

Figure 12:
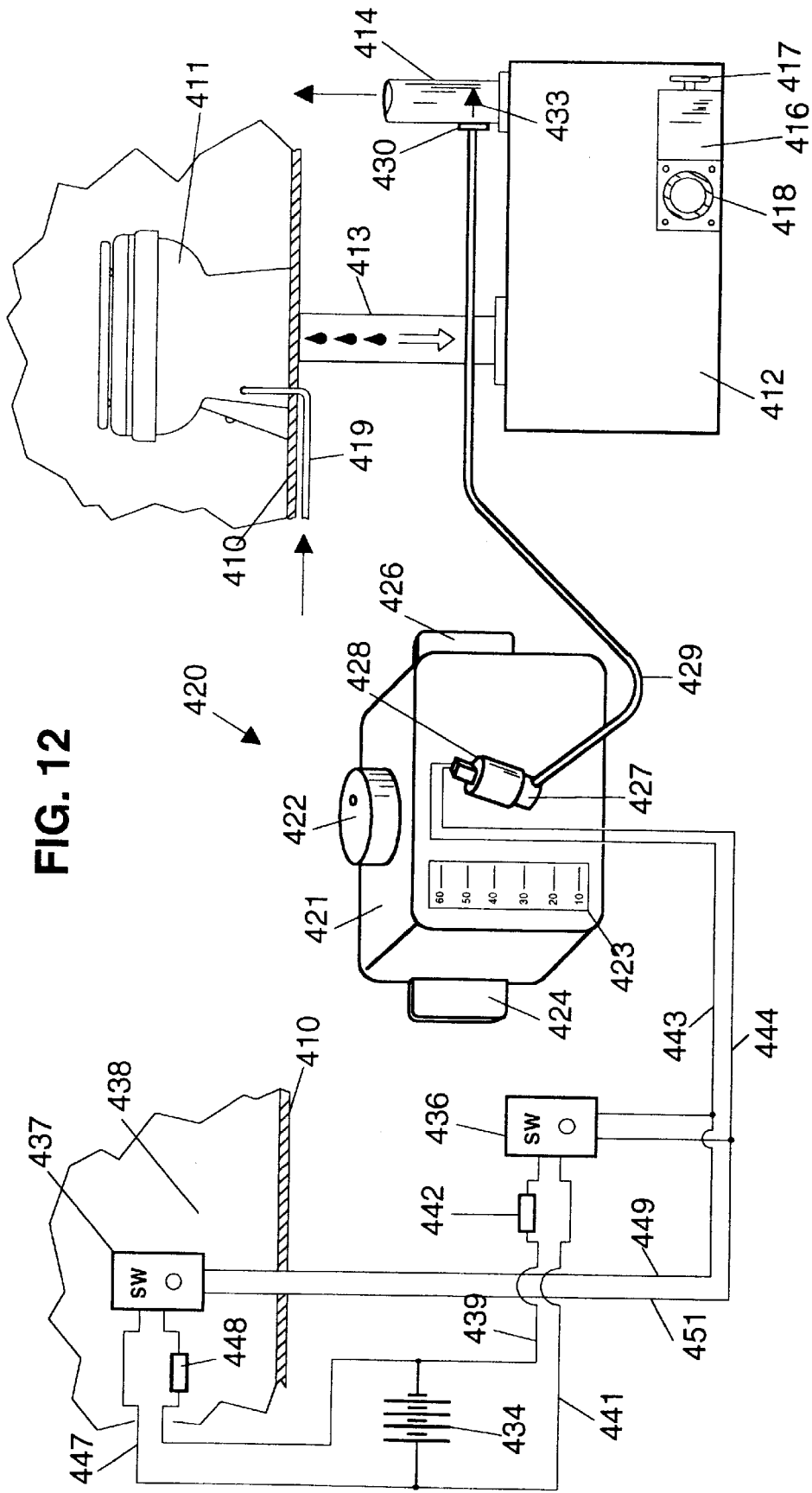
FIG. 12 is a diagrammatic view, partly sectioned, of a seventh embodiment of the liquid chemical delivery apparatus of FIG. 1.

A seventh embodiment of the liquid chemical delivery apparatus is indicated generally at 420 in FIG. 12. The parts and functions thereof of apparatus 420 that correspond to the parts of apparatus 20, shown in FIG. 1, have the same reference numbers with the prefix 4. The tube 429 carrying liquid chemical discharged by pump 427 is joined to a connector 430 mounted on vent pipe 414. Connector 430 has the nozzle sealing structure of connector 430 extended through a hole in vent pipe 414 and is clamped onto the wall of pipe 414. Liquid chemical, shown as arrow 433, is dispensed into vent tube 414 and flows downwardly into tank 412.

Figure 13:
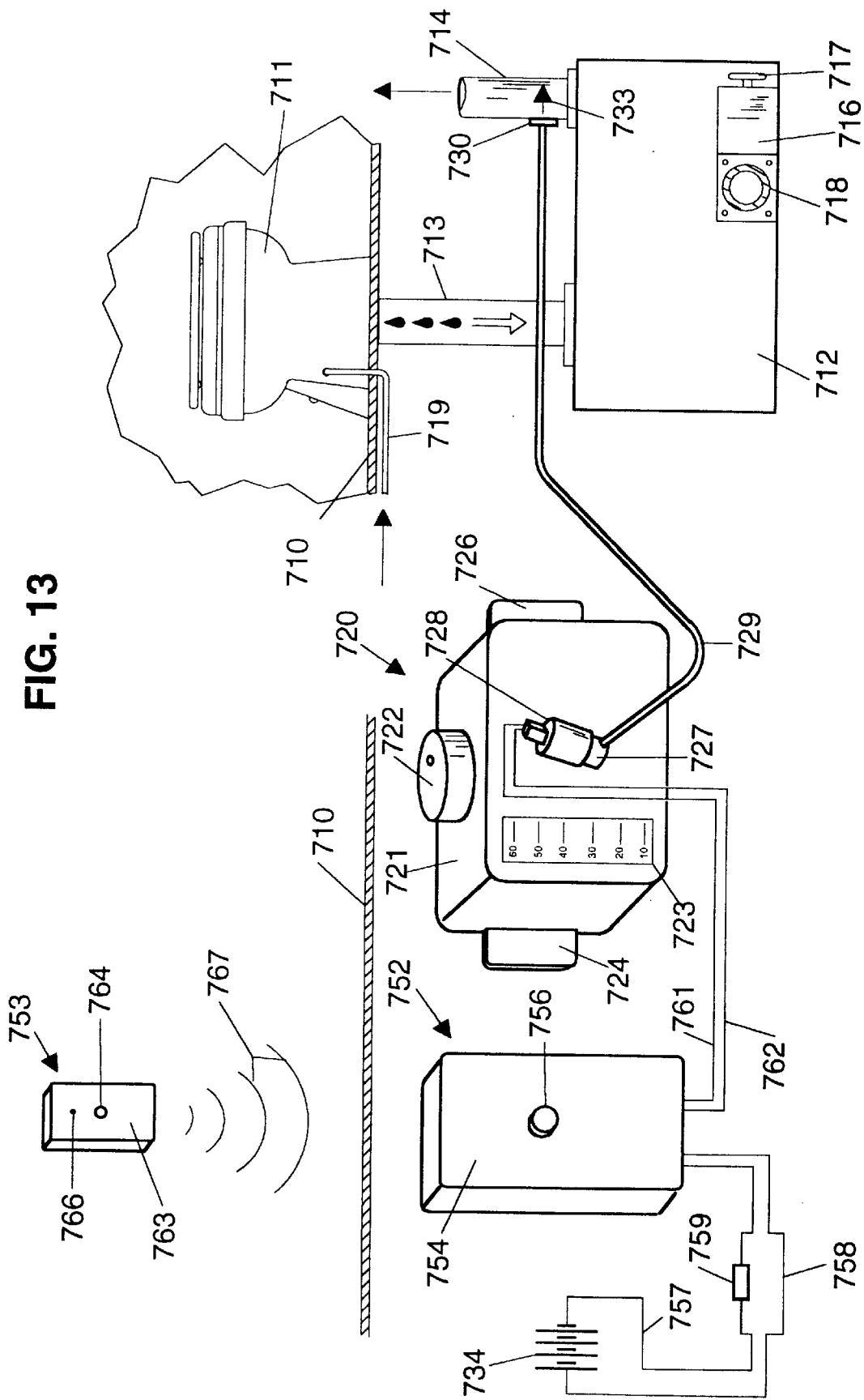
FIG. 13 is a diagrammatical view, partly sectioned, of an eighth embodiment of the liquid chemical delivery apparatus of FIG. 1.

An eighth embodiment of the liquid chemical delivery apparatus, shown in FIG. 13, is indicated generally at 720. The parts and functions thereof of apparatus 720 that correspond to the parts of apparatus 220 have the prefix 7 in lieu of prefix 2. The tube 729 carrying liquid chemical discharged by pump 727 is joined to connector 730 mounted on vent pipe 714. Connector 730 has the nozzle sealing structure of connector 32 shown in FIGS. 8 and 9. Connector 730 extended through a hole in vent pipe 714 is clamped onto the wall of pipe 714. Liquid chemical, as shown as arrow 733, is dispensed into vent tube 714 and flows downwardly into tank 712.

Although present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for dispensing a liquid chemical into a septic system having a toilet bowl, a liquid and solid holding tank, a pipe connecting the bowl and tank, and a vent stack connected to the tank comprising: a bottle having a chamber for holding a liquid chemical, a pump connected to the bottle operable to draw the liquid chemical from the chamber of the bottle and discharge the liquid chemical into a septic system, a tube connected to the pump for receiving the liquid chemical discharged by the pump, means for connecting the tube to the septic system whereby liquid chemical is directed into the tank, a check valve connected to the tube operable to block the flow of liquid toward the pump a connector attached to the check valve adapted to be attached to the septic system for directing liquid chemical into the septic system, an electric motor connected to the pump for driving the pump whereby the pump draws liquid chemical from the chamber of the bottle and discharges liquid chemical into the tube which transports the liquid chemical to the septic system, and control means connected to the electric motor operable to connect the electric motor to a source of electric power, said control means having a first control operable to connect the electric motor to the source of electric power and a second control operable independently of the first control to connect the electric motor to the source of electric power whereby the electric motor is operable in response to activation of either the first or second control to drive the pump.

2. The apparatus of claim 1 wherein: the means adapted to connect the tube to the septic system comprises a connector adapted to be mounted on the tank.

3. The apparatus of claim 1 wherein: the means adapted to connect the tube to the septic system comprises a connector adapted to be mounted on the pipe connecting the bowl and tank.

4. The apparatus of claim 1 wherein: the means adapted to connect the tube to the septic system comprises a connector adapted to be mounted on the vent stack.

5. The apparatus of claim 1 wherein: the means adapted to connect the tube to the septic system comprises a remote end of the tube extended into the toilet bowl for discharging liquid chemical into the toilet bowl.

6. The apparatus of claim 1 wherein: the first control is a manually activated switch which, when turned on, connects the electric motor to the source of electric power.

7. The apparatus of claim 6 wherein: the second control is a manually activated switch which, when turned on, connects the electric motor to the source of electric power.

8. The apparatus of claim 6 wherein: the second control includes a motor controller connected to the source of electric power and the electric motor, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller.

9. The apparatus of claim 8 wherein: the motor controller includes an internal battery for providing the motor controller with a source of electric power.

10. The apparatus of claim 9 wherein: the motor controller includes a low power voltage regulator.

11. The apparatus of claim 1 wherein: the means for connecting the tube to the septic system includes a connector having a first member with a passage for receiving liquid chemical transported in the tube, an elongated second member threaded to the first member, an enlarged head joined to the second member, said second member and head having a passage in communication with the passage of the first member for carrying liquid chemical, a bushing mounted on the second member adjacent the head, and a sleeve of flexible material surrounding the second member and bushing engagable with said head, whereby when the first member is threaded on the second member, the head moves toward the first member compressing and circumferentially expanding the sleeve which, when located in a hole in the septic system, mounts and seals the sleeve to the septic system.

12. The apparatus of claim 11 wherein: the sleeve has a cylindrical body and an annular outwardly extended flange joined to the sleeve.

13. The apparatus of claim 12 including: an annular washer surrounding the second member located between the first member and annular flange, said washer having an annular surface, said first member having an annular surface located in engagement with the annular surface of the washer.

14. The apparatus of claim 1 wherein: the means for connecting the lube to the septic system includes a connector having a first member with a passage for receiving liquid chemical transported in the tube connected to the check valve, an elongated second member threaded to the first member, an enlarged head joined to the second member and head having a passage in communication with the passage of the first member for carrying liquid chemical, a bushing threaded on the second member adjacent the head, and a sleeve of flexible material surrounding the second member and bushing engagable with said head, whereby when the first member is threaded on the second member the head moves toward the first member compressing and circumferentially expanding the sleeve which, when located in a hole in the septic system, mounts and seals the sleeve to the septic system.

15. The apparatus of claim 14 wherein: the sleeve has a cylindrical body and an annular outwardly extended flange joined to the sleeve.

16. The apparatus of claim 15 including: an annular washer surrounding the second member located between the first member and annular flange, said washer having an annular surface, said first member having an annular surface located in engagement with the annular surface of the washer.

17. An apparatus for dispensing a liquid chemical into a septic system having a toilet bowl, a liquid and solid holding tank, a pipe connecting the bowl and tank, and a vent stack connected to the tank comprising: a bottle having a chamber for holding a liquid chemical, a pump connected to the bottle operable to draw the liquid chemical from the chamber of the bottle and discharge the liquid chemical into a septic system, a tube connected to the pump for receiving the liquid chemical discharged by the pump, means for connecting the tube to the septic system whereby liquid chemical is directed into the tank, an electric motor connected to the pump for driving the pump whereby the pump draws liquid chemical from the chamber of the bottle and discharges liquid chemical into the tube which transports the liquid chemical to the septic system, and control means connected to the electric motor operable to connect the electric motor to a source of electric power, said control means having a first control operable to connect the electric motor to the source of electric power and a second control operable independently of the first control to connect the electric motor to the source of electric power whereby the electric motor is operable in response to activation of either the first or second control to drive the pump, and the second control includes a motor controller connected to the source of electric power thereby energizing the electric motor to drive the pump, and a remote signal transmitter operable to generate wireless signals that can be sensed by the signal receiver causing the receiver to operate the motor controller.

18. The apparatus of claim 17 wherein: the motor controller includes an internal battery for providing the motor controller with a source of electric power.

19. The apparatus of claim 17 wherein: the motor controller includes a low power voltage regulator.

20. An apparatus for dispensing a liquid into a structure comprising: first means having a chamber for holding a liquid, a pump connected to the first means operable to draw the liquid from the chamber of the first means and discharge the liquid into the structure; second means connected to the pump for receiving the liquid discharged by the pump, third means connected to the second means [adopted] adapted to be mounted on the structure for directing liquid into the structure, said third means including a check valve operable to block the flow of liquid toward the pump an electric motor connected to the pump for driving the pump whereby the pump draws liquid from the chamber of the first means and discharges the liquid into the second means which transports the liquid to the third means which directs the liquid through the check valve and into the structure, and control means connected to the electric motor operable to connect the electric motor to a source of electric power, said control means having a first control operable to connect the electric motor to the source of electric power whereby the electric motor is operable in response to activation of either the first or second control to drive the pump.

21. The apparatus of claim 20 wherein: the first control is a manually activated switch which when turned on connects the electric motor to the source of electric power.

22. The apparatus of claim 20 wherein: the second control is a manually activated switch which when turned on connects the electric motor to the source of electric power.

23. The apparatus of claim 20 wherein: the second control includes a motor controller connected to the source of electric power and the electric motor, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller.

24. The apparatus of claim 23 wherein: the motor controller includes an internal battery for providing the motor controller with a source of electric power.

25. The apparatus of claim 23 wherein: the motor controller includes a low power voltage regulator.

26. An apparatus for dispensing a liquid into a structure comprising: first means having a chamber for holding a liquid, a pump connected to the first means operable to draw the liquid from the chamber of the first means and discharge liquid into the structure; second means connected to the pump for receiving liquid discharged by the pump, third means connected to the second means adapted to be mounted on the structure for directing liquid into the structure, an electric motor connected to the pump for driving the pump whereby the pump draws liquid from the chamber of the first means and discharges the liquid into the second means which transports the liquid to the third means which driects the liquid into the structure and control means connected to the electric motor operable to connect the electric motor toa source of electric power, said control means having a first control operable to connect the electric motor to the source of electric power and a second control operable independently of the first control to connect the electric motor to the source of electric power whereby the electric motor is operable in response to activation of either the first or second control to drive the pump, the third means including a connector having a first member with a passage for receiving liquid from the second means, an elongated second member threaded to the first member, an enlarged head joined to the second member, said second member and head having a passage in communication with the passage of the first member for carrying liquid, and a sleeve of flexible material surrounding the second member engageable with said head, whereby when the first member is threaded on the second member the head moves toward the first member compressing and circumferentially expanding the sleeve which, when located in the hole in the structure, mounts and seals the sleeve to the structure.

27. The apparatus of claim 26 wherein: the sleeve has a cylindrical body and an annular outwardly extended flange joined to the sleeve.

28. The apparatus of claim 27 including: an annular washer surrounding the second member located between the first member and annular flange, said washer having an annular surface, said first member having an annular surface located in engagement with the annular surface of the washer.

29. An apparatus for dispensing a liquid into a structure comprising: means having a chamber for holding a liquid, a pump connected to the means for holding a liquid operable to draw liquid from the chamber and discharge the liquid into the structure, a check valve operable to prevent liquid discharged by the pump from flowing back toward the pump, connector means for mounting the check valve on the structure, said connector means having a passage for carrying liquid from the check valve to the structure, tube means connected to the pump for receiving the liquid discharged by the pump and to the check valve for carrying the liquid from the pump to the check valve, an electric motor connected to the pump for driving the pump whereby the pump draws liquid from the chamber and discharges the liquid into the tube means, and control means connected to the electric motor operable to connect the electric motor to a source of electric power to energize the electric motor thereby driving the pump, said control means having a first switch operable to connect the electric motor to the source of electric power and a second switch locatable in a location remote from the first switch operable independently of the first switch to connect the electric motor to the source of electric power.

30. The apparatus of claim 29 wherein: the means having a chamber for holding a liquid in a bottle, said pump being connected to the bottle to draw liquid from the chamber and discharge liquid into the tube means.

31. The apparatus of claim 29 wherein: the connector means includes a first member having a passage for receiving liquid from the check valve, a second member threaded to the first member, an enlarged head joined to the second member, said second member and head having a passage in communication with the passage of the first member for carrying liquid to the structure, a bushing threaded on the second member adjacent the head, and a sleeve of flexible material surrounding the second member and bushing engageable with said head whereby when the first member is threaded on the second member the head moves toward the first member compressing and circumferentially expanding the sleeve which when located in a hole in the structure mounts and seals the sleeve on the structure.

32. The apparatus of claim 31 wherein: the sleeve has a cylindrical body and an annular outwardly extended flange joined to the sleeve.

33. The apparatus of claim 32 including: an annular washer surrounding, the second member located between the first member and annular flange, said washer having an annular surface, said first member having an annular surface located in engagement with the annular surface of the washer.

34. The apparatus of claim 29 wherein: the first control is a manually activated switch which when turned on connects the electric motor to the source of electric power.

35. The apparatus of claim 34 wherein: the second control is a manually activated switch which when turned on connects the electric motor to the source of electric power.

36. The apparatus of claim 34 wherein: the second control includes a motor controller connected to the source of electric power and the electric motor, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller.

37. The apparatus of claim 36 wherein: the motor controller includes an internal battery for providing the motor controller with a source of electric power.

38. The apparatus of claim 36 wherein: the motor controller includes a low power voltage regulator.

39. An apparatus for dispensing a liquid into a structure comprising; first means having a chamber for holding a liquid, a pump connected to the first means operable to draw the liquid from the chamber of the first means and discharge liquid into the structure, second means connected to the pump for receiving liquid discharged by the pump, third means connected to the second means adapted to be mounted on the structure for directing liquid into the structure, an electric motor connected to the pump for driving the pump whereby the pump draws liquid from the chamber of the first means and discharged the liquid into the second means which transports the liquid to the third means which directs the liquid into the structure, and control means connected to the electric motor operable to connect the electric motor to a source of electric power, said control means including a motor controller connected to the power source and the electric motor, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller, the third means includes a connector having a first member with a passage for receiving liquid from the second means, an elongated second memeber threaded to the first member, an enlarged head joined to the second member, said second member and head having a passage in communication with the passage of the first member, for carrying liquid and a sleeve of flexible material surrounding the second member, engageable with said head, whereby when the first member is threaded on the second member, the head moves toward the first member compressing and circumferentially expanding the sleeve which when located in a hole in the structure mounts and seals the sleeve to the structure.

40. The apparatus of claim 39 wherein: the motor controller includes an internal battery for providing the motor controller with a source of electric power.

41. The apparatus of claim 40 wherein: the motor controller includes a low-power voltage regulator.

42. The apparatus of claim 39 wherein: the sleeve has a cylindrical body and an annular outwardly extended flange joined to the sleeve.

43. The apparatus of claim 42 including: an annular washer surrounding the second member located between the first member and annular flange, said washer having an annular surface, said first member having an annular surface located in engagement with the annular surface of the washer.

44. The apparatus of claim 39 including a check valve connected to the second and third means operable to block the flow of liquid and gas from the third means back into the second means and allow liquid to flow from the second means to the third means and into the structure.

45. An apparatus for dispensing a liquid into a structure comprising: first means having a chamber for holding a liquid, a pump connected to the first means operable to draw the liquid from the chamber of the first means and discharge the liquid into the structure, second means connected to the pump for receiving the liquid discharged by the pump, third connector means adapted to be connected to the structure for discharging liquid into the structure, a check valve connected to the second means and associated with third connector means operable to block the flow of liquid from the third means back to the second means and pump and allow liquid to flow from the second means to the third means and into the structure, a motor connected to the pump for driving the pump whereby the pump draws liquid from the chamber of the first means and discharges the liquid into the second means which transports the liquid through the check valve to the third means which directs the liquid into the structure, and control means connected to the motor operable to connect the motor to a source of power whereby the motor drives the pump.

46. The apparatus of claim 45 wherein: the control means includes a manually activated control which when activated connects the motor to the source of power.

47. The apparatus of claim 45 wherein: the third means includes a first member having a passage for receiving liquid from the check valve, a second member threaded to the first member, an enlarged head joined to the second member, said second member and head having a passage in communication with the passage of the first member for carrying liquid to the structure, a bushing threaded on the second member adjacent the head, and a sleeve of flexible material surrounding the second member and bushing engageable with said head whereby when the first member is threaded on the second member the head moves toward the first member compressing and circumferentially expanding the sleeve which when located in a hole in the structure mounts and seals the sleeve on the structure.

48. The apparatus of claim 45 wherein: the first means has a chamber for holding a liquid in a bottle, said pump being connected to the bottle to draw liquid from the chamber and discharge liquid into the second means.

49. The apparatus of claim 45 wherein: the motor is an electric motor drivably connected to the pump, and the control means is a manually activated switch which when turned on connects the electric motor to a source of electric power thereby operating the pump.

50. The apparatus of claim 45 wherein: the motor is an electric motor driveably connected to the pump, and the control means includes a motor controller connected to the electric motor and the source of electric power, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller.

51. The apparatus of claim 45 wherein: the motor is an electric motor driveably connected to the pump, said control means having a first control operable to connect the electric motor to the source of electric power and a second control operable independently of the first switch to connect the electric motor to the source of electric power.

52. The apparatus of claim 51 wherein: the first control is a manually activated switch which when turned on connects the electric motor to the source of electric power.

53. The apparatus of claim 51 wherein: the second control is a manually activated switch which when turned on connects the electric motor to the source of electric power.

54. The apparatus of claim 51 wherein: the second control includes a motor controller connected to the source of electric power and the electric motor, a remote signal receiver wired to the motor controller operable to connect the motor controller and the source of electric power thereby energizing the electric motor to drive the pump, and a remote signal transmitter operable to generate wireless signals that can be sensed by the signal receiver causing the receiver to operate the motor controller.

* * * * *